United States Patent
Matsuda

[11] Patent Number: 6,155,944
[45] Date of Patent: Dec. 5, 2000

[54] SILENT CHAIN LINK PLATE WITH CONVEX OUTER FLANK PORTION

[75] Inventor: Akio Matsuda, Nabari, Japan

[73] Assignee: Borg-Warner Automotives, K.K., Japan

[21] Appl. No.: 09/204,034

[22] Filed: Dec. 1, 1998

[30] Foreign Application Priority Data

Dec. 29, 1997 [JP] Japan ................................. 9-368229

[51] Int. Cl.[7] .............................. F16H 7/06; F16G 13/04
[52] U.S. Cl. ............................................ 474/157; 474/213
[58] Field of Search .................................. 474/153, 155, 474/156, 157, 139, 202, 206, 212, 213

[56] References Cited

U.S. PATENT DOCUMENTS

| | | | |
|---|---|---|---|
| 1,140,319 | 5/1915 | Van Houten | 474/139 |
| 1,956,942 | 5/1934 | Belcher et al. | 474/139 |
| 4,854,925 | 8/1989 | Chandrupatla | 474/212 |
| 5,154,674 | 10/1992 | Avramidis et al. | 474/214 |
| 5,236,400 | 8/1993 | Tsuyama | 474/217 |
| 5,267,910 | 12/1993 | Maruyama et al. | 474/212 |
| 5,419,743 | 5/1995 | Takeda | 474/157 |
| 5,464,374 | 11/1995 | Mott | 474/228 |
| 5,902,203 | 5/1999 | Kanehira et al. | 474/212 |
| 5,989,140 | 11/1999 | Ichikawa et al. | 474/212 |

FOREIGN PATENT DOCUMENTS

| | | |
|---|---|---|
| 443581 | 9/1912 | France . |
| 62-41443A | 2/1987 | Japan .................................. 474/212 |
| 4-44543 | 4/1992 | Japan . |
| 230839 | 8/1925 | United Kingdom . |

OTHER PUBLICATIONS

European Search Report dated May 6, 1999 for 98319557.8.

*Primary Examiner*—David A. Bucci
*Assistant Examiner*—Matthew A. Kaness
*Attorney, Agent, or Firm*—Sidley & Austin; Greg Dziegielewski

[57] ABSTRACT

A silent chain link plate that has a plurality of rows of interleaved links or link plates, with each link plate having a pair of apertures. Pivot pins extend through the apertures to connect adjacent rows of links. Each link plate has a pair of teeth for engagement with a sprocket. Each tooth has an inside and outer flank. The outer flank has a flat surface which extends from a first end at the tip of the link plate tooth to a second end adjacent a corresponding aperture. Each tooth has a protruding surface near its corresponding aperture defined as a convex curved surface which protrudes in an outward direction relative from the flat surface on the outer flank of each link tooth adjacent a corresponding aperture and extending to a location on the link surface intersecting a horizontal centerline extending between the apertures.

5 Claims, 4 Drawing Sheets

PRIOR ART

SILENT CHAIN LINK PLATE WITH CONVEX OUTER FLANK PORTION

BACKGROUND OF THE INVENTION

The present invention relates to a silent chain for transmitting power. Such chains are used in automotive transmissions, transfer cases, engine timing systems, and the like. More specifically, the present invention relates to a silent chain in which the outer flanks of each link plate have protruding surfaces near the apertures. The result is an increase in material at points of high stress, which improves the durability of the silent chain as compared with conventional silent chains.

Silent chains are formed by an arrangement of link plates in lateral and longitudinal directions. The links are interlaced and joined by pins inserted into apertures in the link plates, forming a chain that is used in conjunction with a sprocket. A typical chain is composed of inner links, which contact the teeth of the sprocket to provide power transmission, and guide links, which do not provide power transmission. Guide links are employed to maintain the chain on the center of the sprocket. A row of link plates, arranged in the lateral direction, typically has a number of inner links combined with guide links in the center or at both edges of the row.

Conventional silent chains face design problems. In a conventional chain, tension acts to increase the distance between the apertures. As a result, cracks or breakage occur in the zone where the distance between the outside flank and the edge of the aperture is the smallest. In the past, there have been unsatisfactory attempts to solve this problem. Japanese Laid-Open Patent Application No. 4-312161 by Takeda and Kotera teaches a silent chain link plate with an outward protrusion on the flank of the tooth portion of the link plate. Thus, unlike the present invention, it does not improve the durability of the link plate in the vicinity of the aperture. In another design, the width of the entire outer flank of the link plate was increased. However, this resulted in a decrease in the distance between the teeth of adjacent link plates and thus necessitated a decrease in the width of the sprocket teeth. Such a decrease in width made the sprocket teeth highly vulnerable to fracture or breakage.

In yet another design, the width of the outer flank was widened near the aperture by forming the edge of the flank as a straight surface that ran at an exaggerated slant off the vertical. The problem with this design was that it relied to a large extent on weak frictional forces to hold the sprocket teeth and link plate teeth in contact during engagement. As a result, slippage of teeth could not be prevented.

FIG. 7 is a front elevational view of a conventional silent link plate. Link plate 100 has link body 110 in which a pair of pinholes 101, 102 are formed for insertion of the connecting pins. Link body 110 has a pair of teeth 103, 104 which mesh with a sprocket (not shown). Tooth 103 is composed of inside flank 105 and outside flank 106 and tooth 104 is composed of inside flank 105 and outside flank 107.

Tension acts on the entire chain when a silent chain, composed of multiple link plates 100, is in operation and, therefore, the compressive force from the connecting pin acts on pinholes 101, 102 of link plate 100 in the direction of stretching the distance C between pinhole centers (pitch).

As a result, cracks or breakage can occur in zone A (or A') where the distance between outside flank 106 (or 107) and the edge of pinhole 101 (or 102) is the smallest.

Therefore, the strength of the link plate at zone A, A' is increased by increasing the distance between the edge of the pinhole and the outside flank through placement of outside flanks 106, 107 (shown by a double-dotted line in FIG. 7) more to the outside of conventional outside flanks 106, 107 shown by the solid line. However, in such a case, although the strength of the link plate is increased, the thickness of the sprocket belt that meshes with outside flanks 106, 107 of link plate 100 decreases and, as a result, the strength of the sprocket teeth decreases Tilting of outside flanks 106, 107 can be increased, as shown by the broken line in FIG. 7, for increasing of the link plate strength in zone A, A' and insuring the thickness of the sprocket teeth. However, in such a case, the chain tends to skip over the teeth during sprocket engagement.

The present invention is directed at solving the above-described problems. It improves the durability of the link plate without decreasing the strength of the sprocket teeth or causing the sprocket teeth to slip when engaging with the chain.

SUMMARY OF THE INVENTION

The object of the present invention is to increase the durability of silent chains. The outside flanks of the link plates have protruding surfaces near the apertures, thereby increasing the distance between the apertures and the edges of the outside flanks. Thus, the link plate is strengthened in an area susceptible to cracks and breakage, and the durability of the silent chain is improved. Because the thickness of the tip of the link plate tooth is not increased, the sprocket tooth need not be reduced in thickness and thus will not decrease in durability. In addition, since the slant of the link plate tooth edge does not increase, slippage of sprocket teeth does not increase.

For a better understanding of the invention, reference should be made to the following detailed description taken in conjunction with the accompanying drawings.

DETAILED DESCRIPTION OF THE PREFERRED EMBODIMENTS

The present invention is explained below in greater detail with reference to the attached figures.

Figure 1:
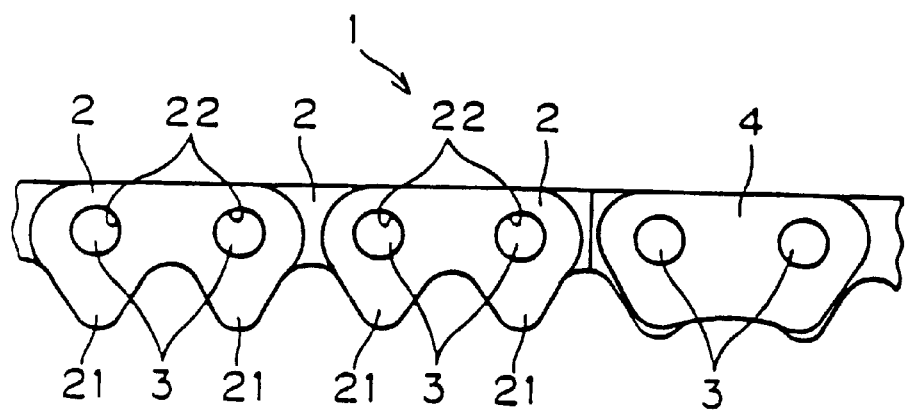
FIG. 1 is a partially cut front elevational view of the silent chain in one embodiment of the present invention.
Figure 2:
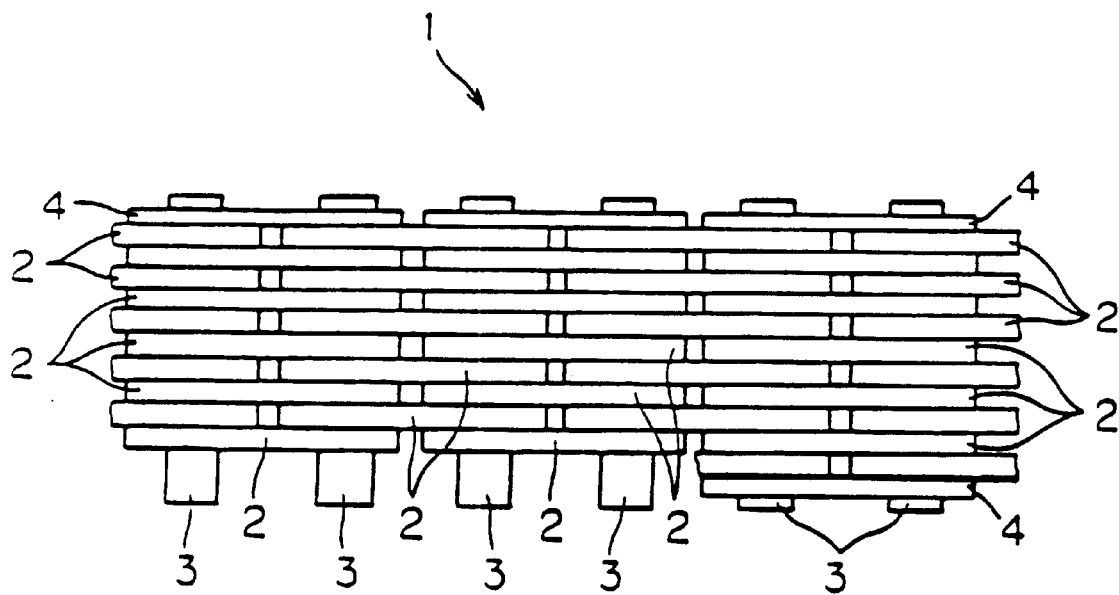
FIG. 2 is a plan view of the silent chain of FIG. 1.

FIG. 1 is a partially cut front elevational view of the silent chain in one embodiment of the present invention; FIG. 2 is its plan view. As shown in both FIG. 1 and FIG. 2, silent chain 1 has multiple link plates 2, each with a pair of teeth 21 and apertures or pinholes 22. Connecting pins 3 are inserted in pinholes 22 to join link plates 2. In addition, silent chain 1 has guide plates 4 on the outermost rows of link plates 2.

Figure 3:
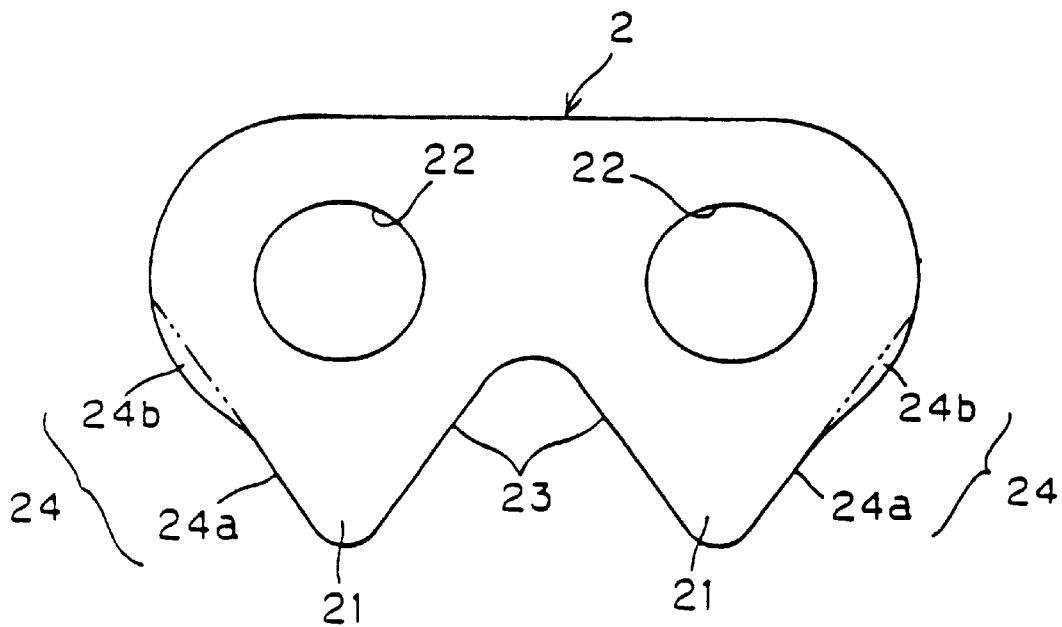
FIG. 3 is a front elevational view of a link plate that is part of the silent chain of FIG. 1.

FIG. 3 is a front elevational view of a link plate that is part of the silent chain of FIG. 1. Tooth 21 has inside flank 23, which has a straight or slightly curved edge, and outside flank 24. Outside flank 24 has nearly straight edge 24a near the tip of tooth 21 and convex edge 24b near pinhole 22. The dotted line shows a conventional outside flank. It is preferable to connect convex edge 24b and flat surface 24a with a small concave section. Convex surface 24b on outside flank 24 increases the material thickness near pinhole 22, and thus, the strength of link plate 2 is increased.

Figure 4:
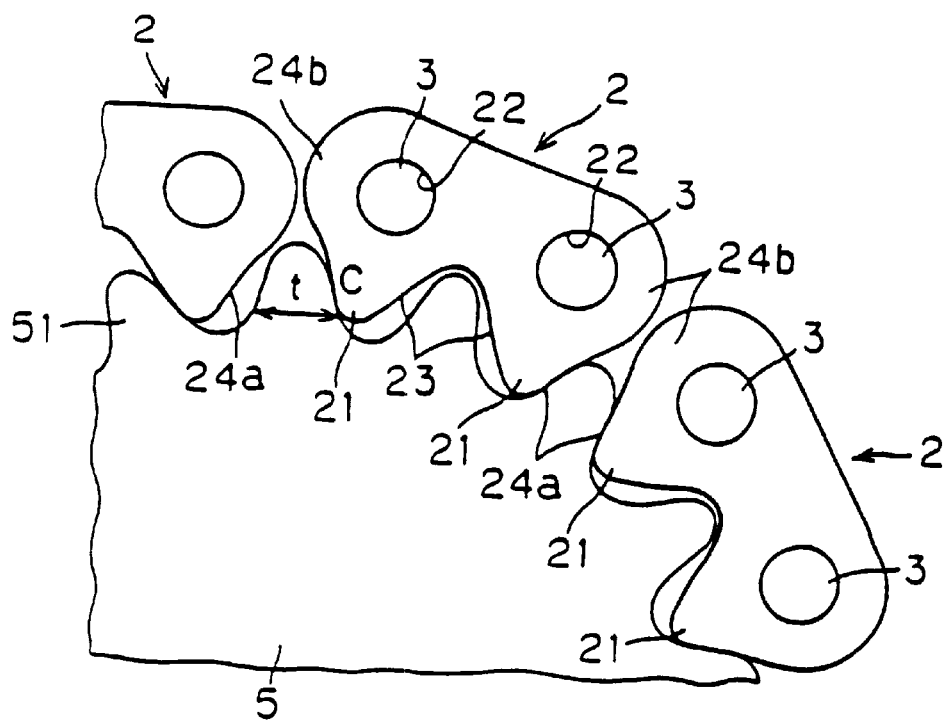
FIG. 4 is a front elevational view of the engagement of some of the link plates that are part of the silent chain of FIG. 1 with a sprocket.

FIG. 4 is a front elevational view of the engagement of some of the link plates that are part of the silent chain of FIG. 1 with a sprocket. Engagement area C is near the center of flat surface 24a of outside flank 24, and convex surface 24b is located near pinhole 22. The engagement of sprocket tooth 51 below convex surface 24b allows space for sufficient material thickness t of sprocket tooth 51 of sprocket 5. Thus, the strength of sprocket tooth 51 is retained and the strength of link plate 2 is increased.

Figure 5:
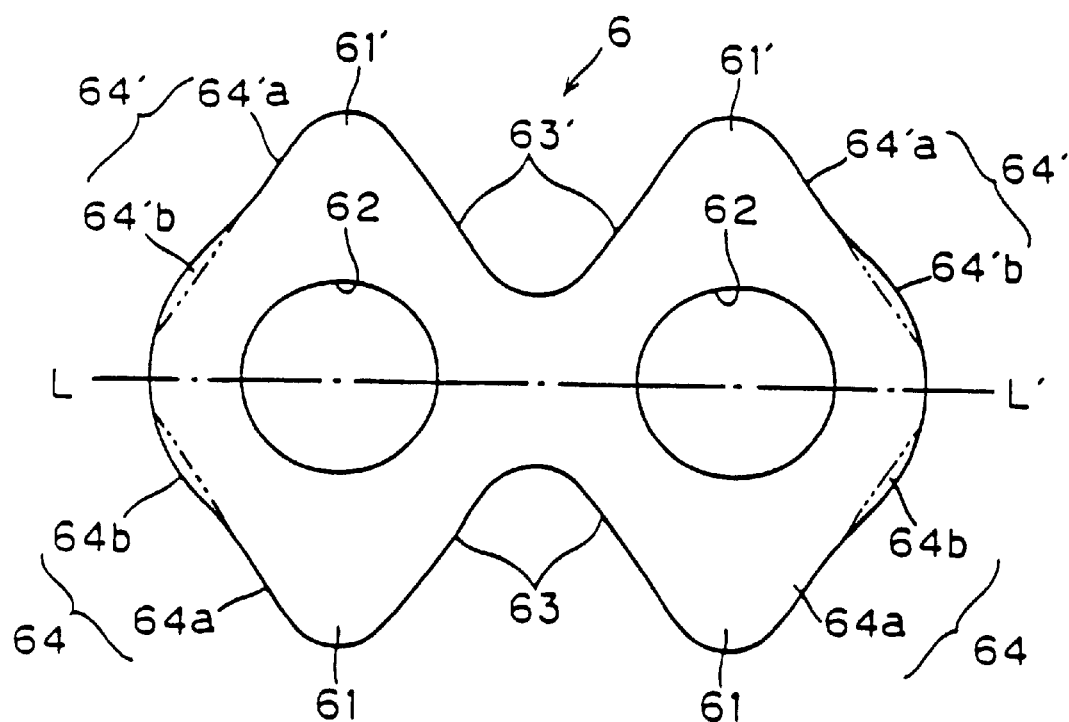
FIG. 5 is a front elevational view of a link plate in an alternative embodiment of the present invention.

FIG. 5 is a front elevational view of a back-driving link plate in an alternative embodiment of the present invention. Link plate 6 has teeth 61, 61' on both sides of center line L-L' drawn between pinholes 62. Tooth 61 has inside flank 63 and outside flank 64, and tooth 61' has inside flank 63' and outside flank 64'. Inside flanks 63, 63' have straight or slightly curved surfaces. Outside flank 64 has nearly straight surface 64a at the tip of tooth 61 and convex surface 64b near pinhole 62. Similarly, outside flank 64' has nearly straight surface 64'a at the tip of tooth 61' and convex surface 64'b near pinhole 62. The dotted line indicates a conventional outside flank. Preferably, convex surfaces 64b, 64b' and flat surfaces 64a, 64a' are connected with a concave section. Convex surfaces 64b, 64'b increase the material thickness near pinhole 62 on outside flanks 64, 64' and thereby increase the strength of link plate 6.

Figure 6:
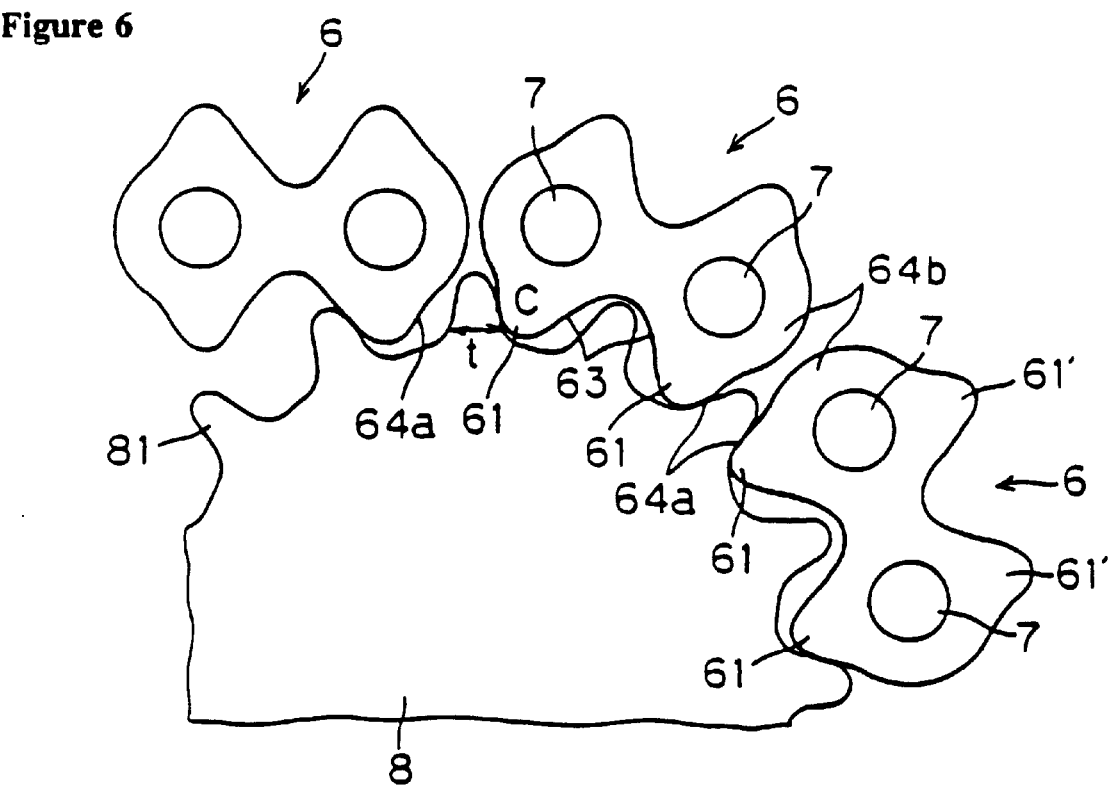
FIG. 6 is a front elevational view of the engagement of link plates of the type shown in FIG. 5 with a sprocket.
Figure 7:
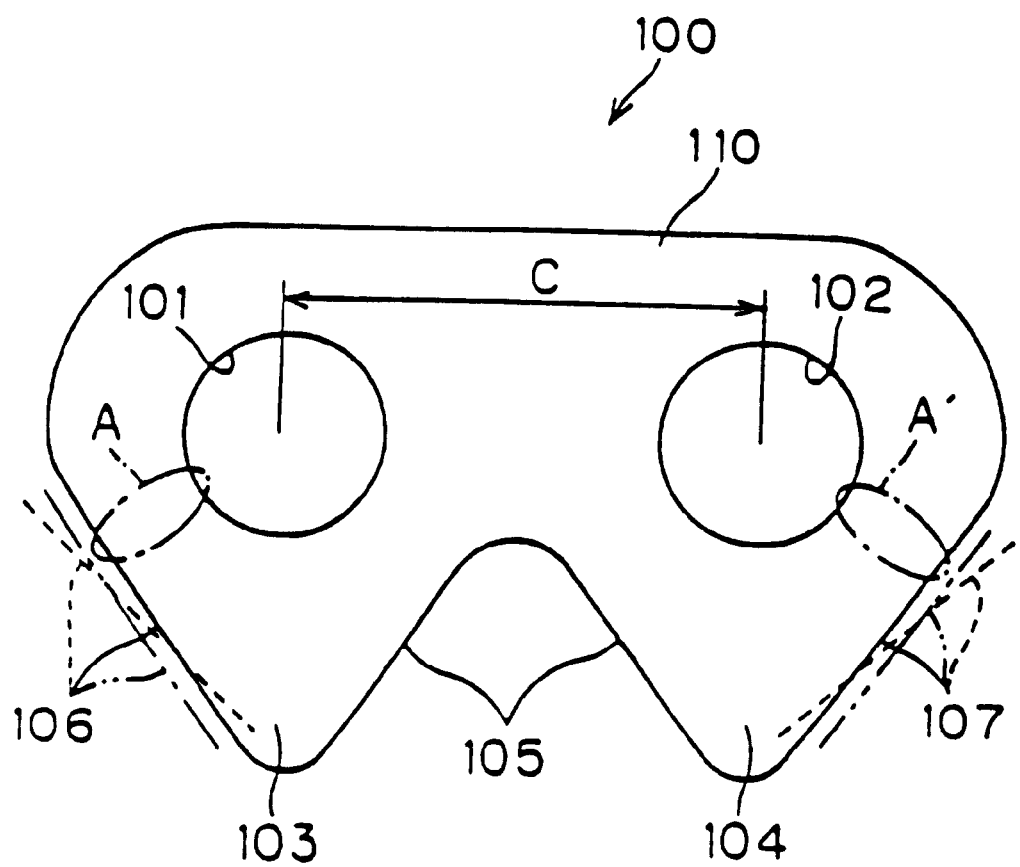
FIG. 7 is a front elevational view of a conventional silent chain link plate.

FIG. 6 is a front elevational view of the engagement of link plates of the type shown in FIG. 5 with a sprocket. Engagement area C is near the center of straight surface 64a, and convex surface 64b is near pinhole 62. Such positioning of engagement area C allows for sufficient material thickness t of sprocket tooth 81 of sprocket 8. Thus, the strength of link plate 6 increases without any accompanying decrease in the strength of sprocket tooth 81. Although not pictured, the engagement of tooth 61' with a sprocket is identical to the engagement of the sprocket with tooth 61.

Those skilled in the art to which the invention pertains will be able to make modifications and other embodiments employing the principles of this invention without departing from its spirit or essential characteristics, particularly upon considering the foregoing teachings. The described embodiments are to be considered in all respects only as illustrative and not restrictive, and the scope of the invention is, therefore, indicated by the appended claims rather than by the foregoing description. Consequently, while the invention has been described with reference to particular embodiments, modifications of structure, sequence, materials and the like would be apparent to those skilled in the art and fall within the scope of the invention.

What is claimed is:

1. A silent chain comprising:
a plurality of rows of interleaved link plates, each of said link plates having a pair of circular apertures and a pair of teeth depending below said apertures, said link plates being interconnected by pivot pins extending through and press fit in said circular said apertures, said pair of teeth being arranged for engagement with teeth of an associated sprocket, each of said teeth of said link plate being formed of an inside flank and an outside flank, said outside flanks having a flat surface for contacting an associated sprocket tooth, said flat surface extending along a surface of said link plate from a first end adjacent a tip portion of said tooth to a second end adjacent said link aperture, each said outside flank having an outwardly protruding convex surface protruding in a direction outward from said flat surface and extending between said flat surface and a location on the link surface of a horizontal centerline extending between said apertures.

2. The silent chain of claim 1, wherein said outside flank has a contact point, said contact point contacting said teeth of said associated sprocket along said outside flank at a point below said protruding surface.

3. The silent chain of claim 1 wherein said convex surface is adjacent said flat surface along said outside flank.

4. The silent chain of claim 3, wherein said convex surface and said flat surface include a concave surface therebetween.

5. The silent chain of claim 1, wherein said link plate includes teeth on opposite sides of said apertures.

* * * * *

UNITED STATES PATENT AND TRADEMARK OFFICE
CERTIFICATE OF CORRECTION

PATENT NO. : 6,155,944 Page 1 of 1
DATED : December 5, 2000
INVENTOR(S) : Akio Matsuda It is certified that error appears in the above-identified patent and that said Letters Patent is hereby corrected as shown below:

<u>Title page,</u>
Item [75], Inventor, after "Nabari" insert -- City --.
Item [73], Assignee, change "Automotives" to -- Automotive --.

<u>Column 4,</u>
Line 20, delete "said" (second occurrence)

Signed and Sealed this

Twenty-fourth Day of September, 2002

*Attest:*

JAMES E. ROGAN
*Attesting Officer*   *Director of the United States Patent and Trademark Office*